US011157970B1

(12) United States Patent
Massanek et al.

(10) Patent No.: US 11,157,970 B1
(45) Date of Patent: Oct. 26, 2021

(54) APPARATUS, METHOD, AND COMPUTER PROGRAM PRODUCT FOR PROVIDING SYNCHRONOUS DELIVERY OF ACTIVE MEDIA AND ELECTRONIC MARKETING COMMUNICATIONS

(71) Applicant: Groupon, Inc., Chicago, IL (US)

(72) Inventors: Geoffrey Massanek, Chicago, IL (US);
Erik Benoist, Chicago, IL (US);
Abhishek Pillai, Chicago, IL (US);
Steven Weber, Chicago, IL (US);
Henry Bissonnette, Chicago, IL (US);
Theron Humiston, Chicago, IL (US);
Samuel Lopes, Seattle, WA (US); Ivan Moscoso, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 983 days.

(21) Appl. No.: 15/144,371

(22) Filed: May 2, 2016

Related U.S. Application Data

(60) Provisional application No. 62/155,753, filed on May 1, 2015.

(51) Int. Cl.
*G06Q 30/02* (2012.01)
*G06Q 30/06* (2012.01)
*H04L 29/08* (2006.01)

(52) U.S. Cl.
CPC ..... *G06Q 30/0277* (2013.01); *G06Q 30/0241* (2013.01); *G06Q 30/0601* (2013.01); *H04L 67/1095* (2013.01)

(58) Field of Classification Search
None
See application file for complete search history.

(56) References Cited

U.S. PATENT DOCUMENTS 9,659,080 B1 * 5/2017 Drobychev .......... G06F 16/1844
2007/0234196 A1 * 10/2007 Nicol .................... G06F 17/211
715/205

(Continued)

OTHER PUBLICATIONS

Pfeiffer et al., "The Continuous Media Web: a distributed multimedia information retrieval architecture extending the World Wide Web," Springer-Verlag, Multimedia Systems (2005) 10(6): 544-558, Aug. 8, 2005. (Year: 2005).*

(Continued)

*Primary Examiner* — Christopher B Tokarczyk
(74) *Attorney, Agent, or Firm* — Alston & Bird LLP

(57) ABSTRACT

A system, method, and computer program product are provided herein. An example system apparatus configured to provide synchronous delivery of active media and electronic marketing communications to a client, the apparatus including a processor including one or more processing devices configured to perform independently or in tandem to execute hard-coded functions or execute software instructions, and a memory including one or more volatile or non-volatile electronic storage devices storing computer-readable instructions, the computer-readable instructions being configured, when executed, to cause the processor to receive the electronic marketing communications, receive the active media, wherein the active media corresponds to the electronic marketing communications, synchronize the active media and the electronic marketing communications based at least in part on one or more receipt identifiers, and provide the active media and the electronic marketing communications to the client device.

13 Claims, 11 Drawing Sheets

(56) References Cited

U.S. PATENT DOCUMENTS

| | | | | |
|---|---|---|---|---|
| 2008/0256203 | A1* | 10/2008 | Gorty | H04L 51/36 |
| | | | | 709/206 |
| 2008/0282305 | A1* | 11/2008 | Uhrig | G06Q 20/10 |
| | | | | 725/114 |
| 2011/0106662 | A1* | 5/2011 | Stinchcomb | G06Q 30/06 |
| | | | | 705/26.43 |
| 2011/0239253 | A1* | 9/2011 | West | H04N 21/2668 |
| | | | | 725/46 |
| 2011/0313840 | A1* | 12/2011 | Mason | G06Q 30/02 |
| | | | | 705/14.35 |
| 2013/0160039 | A1* | 6/2013 | Mentz | H04N 13/341 |
| | | | | 725/14 |
| 2017/0195271 | A1* | 7/2017 | Abraham | H04L 12/1822 |

OTHER PUBLICATIONS

Ooyala; Live Streaming TV Online [online] [retrieved Nov. 16, 2016]. Retrieved from the Internet: <URL: http://www.ooyala.com/live-streaming>. 4 pages.

Kaltura; Live Streaming [online] [retrieved Nov. 16, 2016]. Retrieved from the Internet: <URL: http://corp.kaltura.com/Products/Features/Live%20Streaming>. 2 pages.

* cited by examiner

APPARATUS, METHOD, AND COMPUTER PROGRAM PRODUCT FOR PROVIDING SYNCHRONOUS DELIVERY OF ACTIVE MEDIA AND ELECTRONIC MARKETING COMMUNICATIONS

CROSS REFERENCE TO RELATED APPLICATIONS

This application claims the benefit of U.S. Provisional Application No. 62/155,753, titled "Apparatus, Method, and Computer Program Product For Providing Synchronous Delivery Of Active Media And Electronic Marketing Communications," filed May 1, 2015, which is incorporated by reference herein in its entirety.

FIELD

Example embodiments of the present invention relate generally to electronic user interfaces that integrate active media.

BACKGROUND

Applicant has discovered problems with existing systems and methods for providing user interfaces. For example, while banner advertisements on webpages interfaces may include videos, they fail to provide delivery of active media with other information in a synchronized, efficient, and scalable manner for electronic systems. Through applied effort, ingenuity, and innovation, Applicant has solved many of these identified problems by developing a solution that is embodied by the present invention and described in detail below.

BRIEF SUMMARY

An apparatus, method, and computer program product are therefore provided for providing synchronous delivery of active media and electronic marketing communications via a promotion and marketing service.

An apparatus configured to provide synchronous delivery of active media and electronic marketing communications to a client device associated with a promotion framework, the apparatus comprising a processor including one or more processing devices configured to perform independently or in tandem to execute hard-coded functions or execute software instructions; and a memory comprising one or more volatile or non-volatile electronic storage devices storing computer-readable instructions, the computer-readable instructions being configured, when executed, to cause the processor to: receive the electronic marketing communications; receive the active media, wherein the active media corresponds to the electronic marketing communications; synchronize the active media and the electronic marketing communications based at least in part on one or more receipt identifiers; and provide the active media and the electronic marketing communications to the client device.

In some embodiments, the memory stores computer-readable instructions that, when executed, cause the processor to: receive, via synchronous integration circuitry, a synchronous integration request to associate with a synchronous integration interface; and provide, via synchronous integration circuitry, the synced active media and the electronic marketing communications to the client device.

In some embodiments, the memory stores computer-readable instructions that, when executed, cause the processor to: determine, via the processing circuitry, a synchronous integration identifier count based on one or more synchronous integration identifiers; and determine, via the processing circuitry, whether the synchronous integration identifier count exceeds a synchronous integration progress threshold.

In some embodiments, the memory stores computer-readable instructions that, when executed, cause the processor to: decrease, via the processing circuitry, an active sync component in response to the synchronous integration identifier count exceeding the synchronous integration progress threshold.

In some embodiments, the memory stores computer-readable instructions that, when executed, cause the processor to: increase a discount value in response to the synchronous integration identifier count exceeding the synchronous integration progress threshold.

In some embodiments, the client device comprises a synchronous integration interface.

In some embodiments, the synchronous integration interface comprises a promotion expiration indicator configured to indicate a promotion duration period.

In some embodiments, the synchronous integration interface comprises a promotion queue configured to indicate one or more subsequent promotions.

In some embodiments, the synchronous integration interface comprises the electronic marketing communications configured to receive active updates to one or more promotion components.

In some embodiments, the one or more promotion components comprise a promotional value, discount value, and an active sync component.

In some embodiments, the discount value is configured to decrease or increase.

In some embodiments, the active sync component is configured to increase or decrease based on the discount value.

In some embodiments, the synchronous integration interface comprises an active notification configured to indicate availability of the electronic marketing communications.

In some embodiments, the memory stores computer-readable instructions that, when executed, cause the processor to: receive an indication of a transaction in response to the selection of a link, an icon, or a button.

In some embodiments, the client device is configured to receive, via a production control manager, active updates.

In some embodiments, the client device is configured to receive, via a production control manager, active updates to one or more promotion components in response to the dual delivery management circuitry receiving an audio trigger.

In some embodiments, the memory stores computer-readable instructions that, when executed, cause the processor to: provide a dynamic interaction screen based on a synchronous integration identifier associated with the synchronous integration interface.

In some embodiments, the production control manager is configured to receive a promotion expiration value.

In some embodiments, the promotion expiration value indicates a promotion duration period.

In some embodiments, the production control manager comprises a promotion queue further comprising the electronic marketing communications.

In some embodiments, the production control manager is configured to update one or more promotion components, wherein the one or more promotion components comprise a promotional value, discount value, and an active sync component.

In some embodiments, the production control manager is configured to increase or decrease the active sync component.

In some embodiments, the production control manager is configured to decrease or increase the discount value.

In some embodiments, the production control manager comprises one or more rapid value indicators configured to decrease or increase the discount value.

In some embodiments, the production control manager comprises a consumer rating indicator.

In some embodiments, the production control manager is configured to indicate one or more synchronous integration identifiers associated with the synchronous integration interface.

In some embodiments, the production control manager is configured to generate a plurality of dynamic interaction screens based on the synchronous integration identifiers, and wherein the dynamic interaction screen corresponds to electronic marketing communications associated with the synchronous integration interface.

A machine implemented method for providing synchronous delivery of active media and electronic marketing communications to a client device associated with a promotion framework, the method comprising: receiving, via processing circuitry, the electronic marketing communications; receiving, via a streaming device, the active media, wherein the active media corresponds to the electronic marketing communications; synchronizing, via synchronous delivery management circuitry, the active media and the electronic marketing communications based at least in part on one or more receipt identifiers; and providing, via the processing circuitry, the active media and the electronic marketing communications to the client device.

A computer program product comprising a non-transitory computer readable storage medium storing instructions that, when executed by a processor, cause the processor to configure an apparatus to: receive the electronic marketing communications; receive the active media, wherein the active media corresponds to the electronic marketing communications; synchronize the active media and the electronic marketing communications based at least in part on one or more receipt identifiers; and provide the active media and the electronic marketing communications to the client device.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The above summary is provided merely for purposes of summarizing some example embodiments to provide a basic understanding of some aspects of the invention. Accordingly, it will be appreciated that the above-described embodiments are merely examples and should not be construed to narrow the scope of the invention in any way. It will be appreciated that the scope of the invention encompasses many potential embodiments in addition to those here summarized, some of which will be further described below.

BRIEF DESCRIPTION OF THE DRAWINGS

Having therefore described certain example embodiments of the present disclosure in general terms, reference will now be made to the accompanying drawings, which are not necessarily drawn to scale, and wherein.

DETAILED DESCRIPTION

Overview

Figure 1:
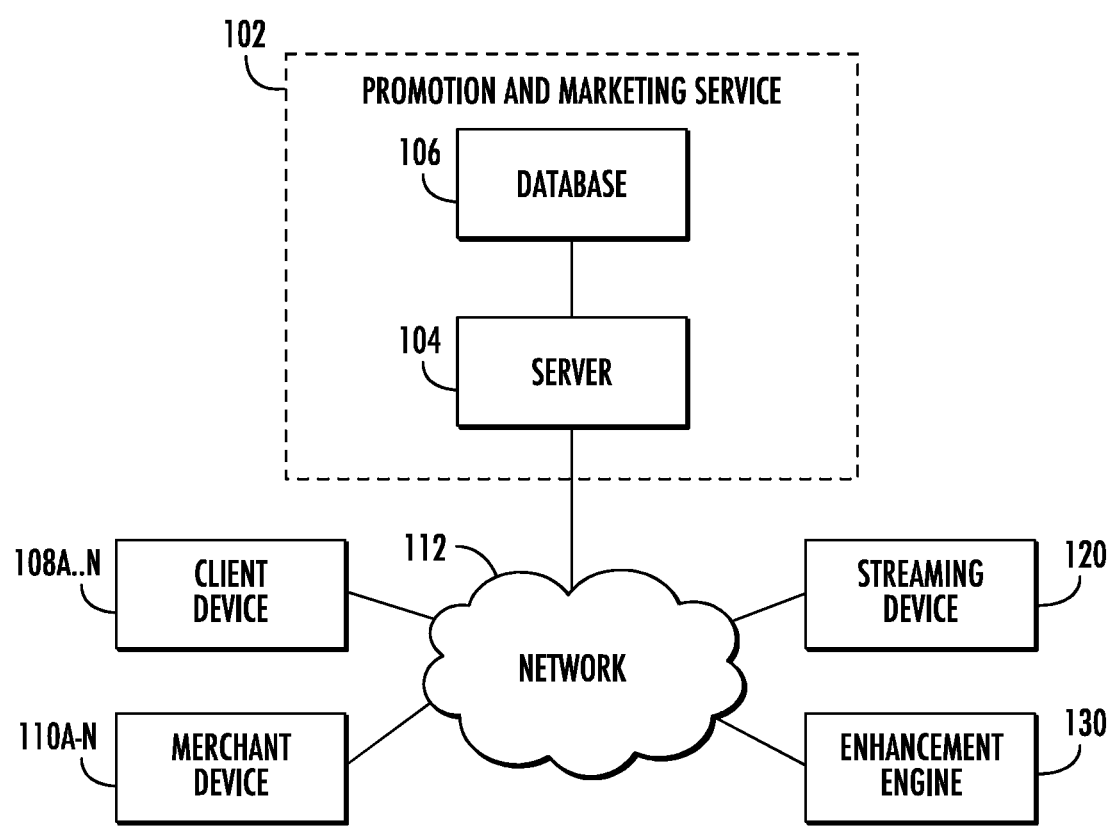
FIG. 1 illustrates a block diagram of an example system according to some example embodiments.

Various embodiments of the present invention are directed to improved apparatuses, methods, and computer readable media for providing synchronous (e.g., simultaneous, or near simultaneous) delivery of active media (e.g., video, audio, streaming content, etc.), and electronic marketing communications to a client device (e.g., a personal computer) associated with a promotion and marketing service. The promotion and marketing service may receive electronic marketing communications for inclusion in the synchronous integration interface via a production control manager (e.g., a production dashboard configured to receive electronic marketing communication requests input by a producer for syncing with active media).

Simultaneously or additionally, the promotion and marketing service may receive, via a streaming device (e.g., a device configured to capture visual images, sound, etc.), active media as a host describes various promotions for purchase by a consumer. In turn, the promotion and marketing service may synchronize the active media and the electronic marketing communications received based at least in part on one or more receipt identifiers (e.g., a timestamp encoded in the metadata of the active media file stream).

Upon receiving a request to associate with a synchronous integration interface (e.g., a graphical user interface) from a client device associated with a consumer, a promotion and marketing service may provide, via the synchronous integration interface, synchronous delivery of active media and electronic marketing communications to the client device. To that end, the promotion and marketing service may generate the synchronous integration interface and associate such interface with the client device. The synchronous integration interface may comprise one or more promotion components (e.g., a promotional value, discount value, and an active sync component), a promotion expiration value, and/or other promotion content. The promotion expiration value may indicate the duration of the promotion (e.g., a countdown timer displaying a value) via the synchronous integration interface. The synchronous integration interface may further include an active notification (e.g., a scrolling marquee, banner, or other like communication means configured to indicate availability of the electronic marketing communications). The active notification may, for example, create a sense of urgency to incentivize consumers to engage in transactions while accessing the synchronous integration interface. The invention as described embodies the development of an unconventional framework that solves technological problems such as the inability to provide fast, scalable, real time, or near real-time, communications and media corresponding to promotions to multiple client devices simultaneously. As will be appreciated, the promotion and marketing service has solved such technological problems providing active media, electronic marketing communications, and updates to corresponding promotion components and/or content to a client device simultaneously in real-time, or near real-time, in a manner that is efficient and scalable to meet the demands of serving multiple client devices.

The promotion and marketing service may further provide for incentives to engage consumers and positively impact the amount of promotions transacted. Accordingly, the promotion and marketing service may provide active updates (e.g., an update to one or more promotion components performed at, or near, real-time). For example, as the quantity of client devices associated with the synchronous integration interface fluctuates, the active sync component (e.g., the promotional price offered) may be decreased based upon a synchronous integration ("SI") identifier count.

Furthermore, the promotion and marketing service as described herein may provide for improved interactions with the promotion and marketing service by providing promotions based on individual SI identifiers (e.g., providing promotions to individual consumers) relevant to a consumers interest based on relevance data, location data, promotion data, or the like. For example, a dynamic interaction screen (e.g., a green screen) associated with an enhancement engine as described herein below may be configured to provide electronic marketing communications (e.g., local Chicago promotions) relevant to a consumer based on location data received via the client device associated with that consumer.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present electronic marketing communications via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of electronic marketing communications.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account.

A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion value (e.g. a promotion price), promotion discount levels (e.g., discount values), promotion style sheets, promotion fonts, promotion e-mail subjects, promotion quantities, promotion fine print options, promotion fees assessed to the merchant by the promotion and marketing service, or the like. Promotion components may also include active sync components (e.g., a specially purposed promotional price or other like components) which may be updated simultaneously in real-time, or near real-time, Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any promotion components, email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

The term "active media" as used herein should be understood to refer to video, audio, streaming content, or like content which may be sent in a compressed form. In some embodiments, the active media may include a host and/or guests who describe various promotions (e.g., products, items, getaways, or the like) for purchase by a consumer. In some embodiments, the active media may be received by a streaming device. The streaming device may be any device known in the art configured to capture, via hardware or programmatic instructions, visual images, sound, or the like. For example, the streaming device may include camcorders, cameras, video recorders, audio recorders, digital recorders, digital cameras, and the like configured to capture photographs, audio, film, video signals and the like. The streaming device may be configured to provide such visual images or sound to a promotion and marketing service.

The term "receipt identifier" as used herein should be understood to refer to characters or encoded data identifying the occurrence of an event. A receipt identifier may refer to a date, time of day, or period of time that an event occurred. In some embodiments, the active media and the electronic marketing communications may be synchronized based at least in part on one or more receipt identifiers. For example, upon receiving the active media via a streaming device, a receipt identifier (e.g., a timestamp) may be encoded. In some embodiments, the receipt identifier may be encoded in the metadata of the active media file stream.

In some embodiments, a client device may be associated with a SI identifier. As used herein, the term "SI identifier" should be understood to refer to an identifier associated, via a client device, with a synchronous integration interface which may identify a particular client device. In some embodiments, the SI identifier may include communication channel data (as described herein below), consumer data, transaction data (e.g., consumer payment information or billing information) associated with a particular consumer. In the present context, "consumer data" is understood to refer to any electronic data that identifies particular characteristics of a particular consumer (e.g., a name, address, age, interests, or the like). A SI identifier may be associated with electronic marketing communications. A SI identifier may be associated with both promotions purchased or otherwise redeemable by the consumer (e.g., promotions for which the consumer possesses a valid instrument or other redemption mechanism), and unpurchased and/or unredeemable promotions. For example, a given SI identifier may include communication channel data (e.g., the Internet Protocol (IP) address of the client device). In some embodiments, a SI identifier may be associated with a synchronous integration interface featuring an electronic marketing communication comprising a promotion (e.g., a promotion for "Roboraptor X Dinosaur Robot").

Figure 6:
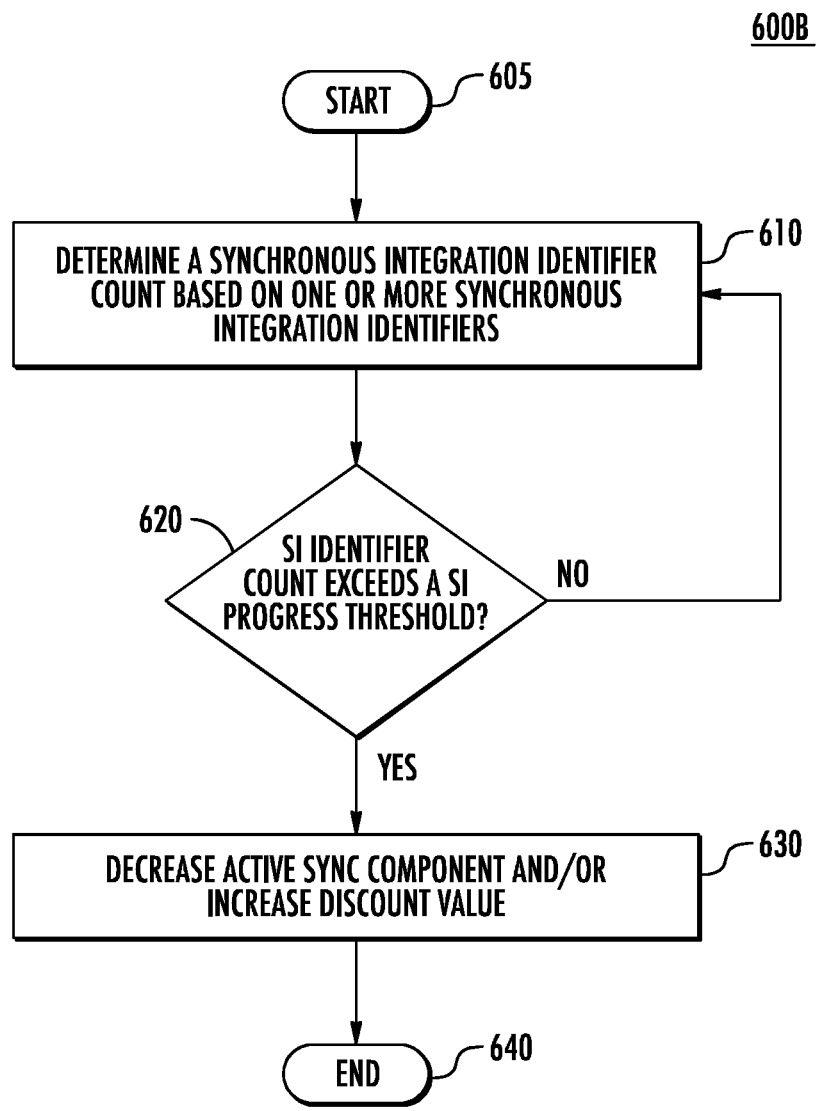
FIG. 6 illustrates a flowchart showing an exemplary process for adjusting the active sync component in accordance with some example embodiments discussed herein.

As used herein the term "SI identifier count" may be understood to refer to a number, amount, calculation, or accumulation of one or more SI identifiers which may represent an electronic status of the SI identifiers in relation to exceeding a SI progress threshold as described herein with reference to FIG. 6.

The term "SI progress threshold" may indicate a number or aggregated amount of SI identifiers that must be associated with the synchronous integration interface before an active update may be applied to one or more promotion components. Upon the SI identifier count exceeding the SI progress threshold, the promotion and marketing service may decrease a promotion component (e.g., an active sync component). For example, the "GStream" price may be decreased in response to the SI identifier count (e.g., 5001 SI identifiers) exceeding the SI progress threshold (e.g., 5000 SI identifiers).

The term "promotion queue" may be understood to refer to one or more promotions waiting to be featured via the synchronous integration interface. The one or more promotions included in the promotion queue may be predetermined or determined via relevance circuitry as described herein. In some embodiments, the order of the electronic marketing communications included in the promotion queue may be pre-determined or dynamically ordered via a graphical user interface. Further description with respect to the promotion queue is provided herein with reference to FIGS. 2a, 7, and 10.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

The inventors have identified various problems and difficulties that occur in providing synchronous delivery of active media and electronic marketing communications via a promotional system such as the inability to provide fast, scalable, real time, or near real-time, communications and media corresponding to promotions to multiple client devices simultaneously. The inventors have solved such technological obstacles achieved by developing an unconventional framework that provides said active media, electronic marketing communications, and updates to corresponding promotion components and/or content to a client device simultaneously in real-time, or near real-time. As will be appreciated, the inventors have determined an unconventional framework accomplished in a manner that is efficient and scalable to meet the demands of serving multiple client devices simultaneously.

For example, previous efforts at providing active media and electronic marketing communications required multiple communication channels. However, such requirements limit the content type and volume that may be sent and received between a web browser and server. For example, delivery of synchronous active media and electronic marketing communications may require individual communication channels for the provision and receipt of the active media, promotions, consumer data, and any other corresponding data up to N number of communication channels. Therefore, the ability to provide synchronous delivery of active data and promotions is forfeited, or reduced, due to the inflexibility of systems which are not configured to send and receive active media, promotions, consumer data, and any other corresponding data simultaneously via a full-duplex (e.g., a communication channel configured to provide and receive such data in both directions) communications channel.

The inventors have therefore determined that existing electronic systems fail to address these issues. As a result of these problems and others that may arise from time to time, limitations and inefficiencies may be introduced into the process of providing delivery of active media and electronic marketing communications. Therefore, the inventors have solved for such identified shortcomings taking into account the need for a framework that provides synchronous delivery of active media and electronic marketing communications to a client device using a promotion and marketing service.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, wearable, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more client devices 108A-N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the client devices 108A-N, merchant device 110A-N, streaming device 120, and enhancement engine 130. For example, the server 104 may be operable to receive and process clickstream data provided by the client devices 108 and/or the merchant devices 110. The server 104 may also facilitate e-commerce transactions based on transaction information provided by the client devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The client devices 108A-N may be any computing device as known in the art and may be operated by a consumer, producer, or the like. Electronic data received by the server 104 from the client devices 108A-N may be provided in various forms and via various methods. For example, the client devices 108A-N may include desktop computers, laptop computers, smartphones, netbooks, tablet computers, wearables, and the like. The information may be provided through various sources on these client devices.

In embodiments where a client device 108 is a mobile device, such as a smart phone or tablet, the client device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the client device 108 may interact through the promotion and marketing service 102 via a web browser. As yet another example, the client device 108 may include various hardware or firmware designed to interface with the promotion and marketing service 102 (e.g., where the client device 108 is a purpose-built device offered for the primary purpose of communicating with the promotion and marketing service 102, such as a store kiosk).

The merchant devices 110A-N may be any computing device as known in the art and operated by a merchant. For example, the merchant devices 110A-N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-N may also be provided in various forms and via various methods. For example, the merchant devices 110A-N may provide real-time transaction and/or inventory information as purchases are made from the merchant. In other embodiments, the merchant devices 110A-N may be employed to provide information to the promotion and marketing service 102 to enable the promotion and marketing service 102 to generate promotions or other marketing information to be provided to consumers.

The streaming device 120 may be any device known in the art configured to capture visual images, sound, or the like. For example, the streaming device 120 may include camcorders, cameras, video recorders, audio recorders, digital recorders, digital cameras, and the like configured to capture photographs, audio, film, video signals and the like. The streaming device 120 may be configured to provide such captured visual images or sound to an enhancement engine 130 as described herein below.

The enhancement engine 130 may comprise circuitry configured to receive and/or otherwise enhance active media provided by one or more streaming devices 120. For example, an enhancement engine may receive active media (e.g., a live video recording) via a streaming device (e.g., a high-definition camcorder). The enhancement engine may be configured to associate file formats, such as Flash, WebM, F4V, AVI, QuickTime, Windows Media Video, RealMedia, RealMedia Variable Bitrate, Advanced Systems Format, MPEG-1, MPEG2, MPEG-4, M4V, SVI, 3GPP, 3GPP2, Nullsoft Streaming Video, and the like with the active media. The enhancement engine 130 and/or streaming device 120 may be operable by a publisher, producer, or the like. For example, Flash based ads corresponding to a promotion or merchant may be inserted into the active media. The enhancement engine 130 may be further configured to encode the active media. The active media may be encoded by a device, circuitry, transducer, programmatic instructions, or algorithm configured to convert audio and video data from one format or code to another format or code. Further, the enhancement engine 130 may encode the active media with one or more receipt identifiers (e.g., a timestamp included in the metadata of a file stream) to achieve synchronization.

An example of a data flow for exchanging electronic information among one or more client devices, merchant devices, and the promotion and marketing service is described below with respect to FIG. 3.

Example Apparatuses for Implementing Embodiments of the Present Invention

Figure 2A:
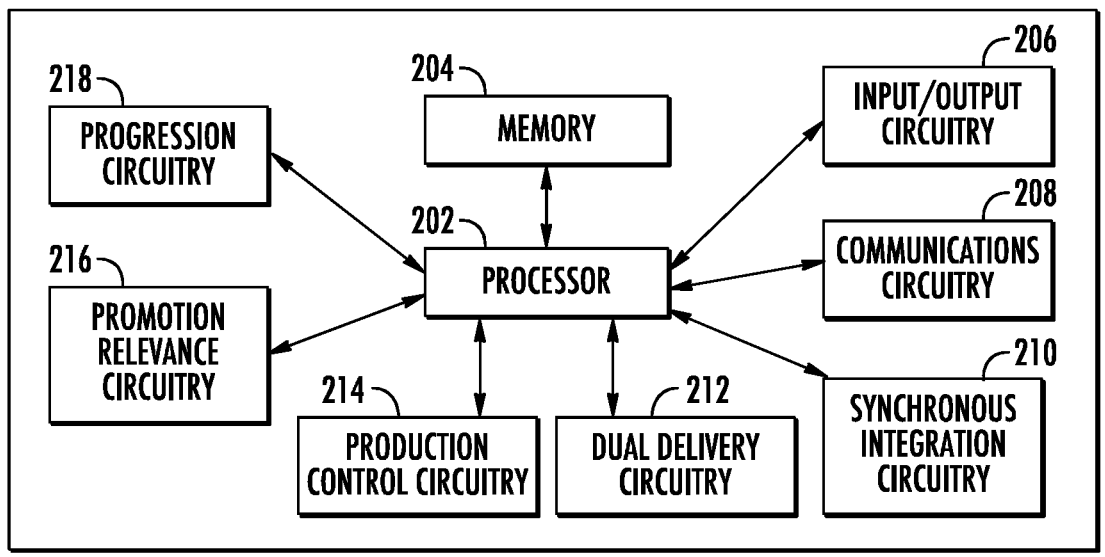
FIG. 2a illustrates a block diagram showing an example server for implementing synchronous delivery of active media and electronic marketing communications using special-purpose circuitry in accordance with some example embodiments of the present invention.

The server 104 may be embodied by one or more computing systems, such as apparatus 200A shown in FIG. 2a. As illustrated in FIG. 2a, the apparatus 200A may include a processor 202, a memory 204, input/output circuitry 206, communications circuitry 208, synchrounous integration circuitry 210, dual delivery circuitry 212, production control circuitry 214, promotion relevance circuitry 216, and subscription relevance circuitry 218. The apparatus 200A may be configured to execute the operations described above with respect to FIG. 1 and below with respect to FIGS. 3-11. Although these components 202-218 are described with respect to functional limitations, it should be understood that the particular implementations necessarily include the use of particular hardware. It should also be understood that certain of these components 202-218 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200A may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200A may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200A. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The dual delivery circuitry 212 includes hardware configured to receive electronic marketing communications. For example, the dual delivery circuitry 212 may receive electronic marketing communications provided, via input/output circuitry 206, in response to a query of the database 106. The electronic marketing communications may be stored in the memory 204 or database 106 by the dual delivery circuitry 212. The dual delivery circuitry 212 may utilize processing circuitry, such as the processor 202, to perform the actions described herein. However, it should also be appreciated that, in some embodiments, the dual delivery circuitry 212 may include a separate processor, specially configured field programmable gate array (FPGA), or application specific interface circuit (ASIC). The dual delivery circuitry 212 is therefore implemented using hardware components of the apparatus configured by either hardware or software for implementing these planned functions.

The production control circuitry 214 includes hardware configured to receive, via a query of the database 106, electronic marketing communications. The electronic marketing communications may correspond to the synchronous integration interface. In some embodiments, the production control circuitry 214 may be configured to receive electronic marketing communications in response to a request to receive electronic marketing communications, promotion data, or the like. For example, the production control circuitry 214 may be configured to receive electronic marketing communications in response to a request (e.g., a request to "get promotion data").

In further embodiments, the production control circuitry 214 may be configured to receive one or more active updates (e.g., an update to one or more promotion components). For example, the production control circuitry 214 may be configured to receive one or more active updates in response to a request to "modify the promotion data." One or more receipt identifiers may be associated with the active updates. The active updates may be stored in the memory 204 or database 106 by the production control circuitry 214.

Alternatively or additionally, the production control circuitry 214 may be configured to provide the electronic marketing communications to the dual delivery circuitry 212. For example, the production control circuitry 214 may "push the electronic marketing communications" to the dual delivery circuitry 212. The electronic marketing communications received by the dual delivery circuitry 212, via the production control circuitry 214, may be stored (e.g., queued) in memory, such as the memory 204 (e.g., one or more internal buffers). The production control circuitry 214 may utilize processing circuitry, such as the processor 202, to perform the actions described herein. However, it should also be appreciated that, in some embodiments, the production control circuitry 214 may include a separate processor, specially configured field programmable gate array (FPGA), or application specific interface circuit (ASIC). The production control circuitry 214 is therefore implemented using hardware components of the apparatus configured by either hardware or software for implementing these planned functions.

The dual delivery circuitry 212 includes hardware configured to receive, via the production control circuitry 214, active media. For example, the dual delivery circuitry 212 may receive a live recording of a host featuring one or more promotions. The active media may correspond to the electronic marketing communications received by the dual delivery circuitry 212.

Upon receiving the active media, the production control circuitry 214, may be configured to display, via the input/output circuitry 206, the active media for viewing by, for example, the producer monitoring a user interface (e.g., a production dashboard) as described herein with reference to FIGS. 8-11.

To that end, the production control circuitry 214 includes hardware configured to provide the active media to dual delivery circuitry 212 for synchronizing of the active media and electronic marketing communications. The active media received by dual delivery circuitry 212, may be stored in memory, such as the memory 204.

In some embodiments, the synchronous integration circuitry 210 and/or the dual delivery circuitry 212 may be operable to synchronize the active media and the electronic marketing communications based at least in part on one or more receipt identifiers. Such receipt identifiers allow the active media to be synced with the electronic marketing communications via the dual delivery circuitry 212 and/or the synchronous integration circuitry 210. To synchronize the electronic marketing communications and the active media, the electronic marketing communications may be de-queued (e.g., removed or provided to one or more components described herein) from the memory 204 (e.g., one or more internal buffers) when a buffer identifier associated with the active media (e.g., encoded in the file stream of the active media) corresponds to (e.g., matches, aligns, etc.) a buffer identifier associated with the electronic marketing communications as described herein with reference to FIG. 4.

Figure 4:
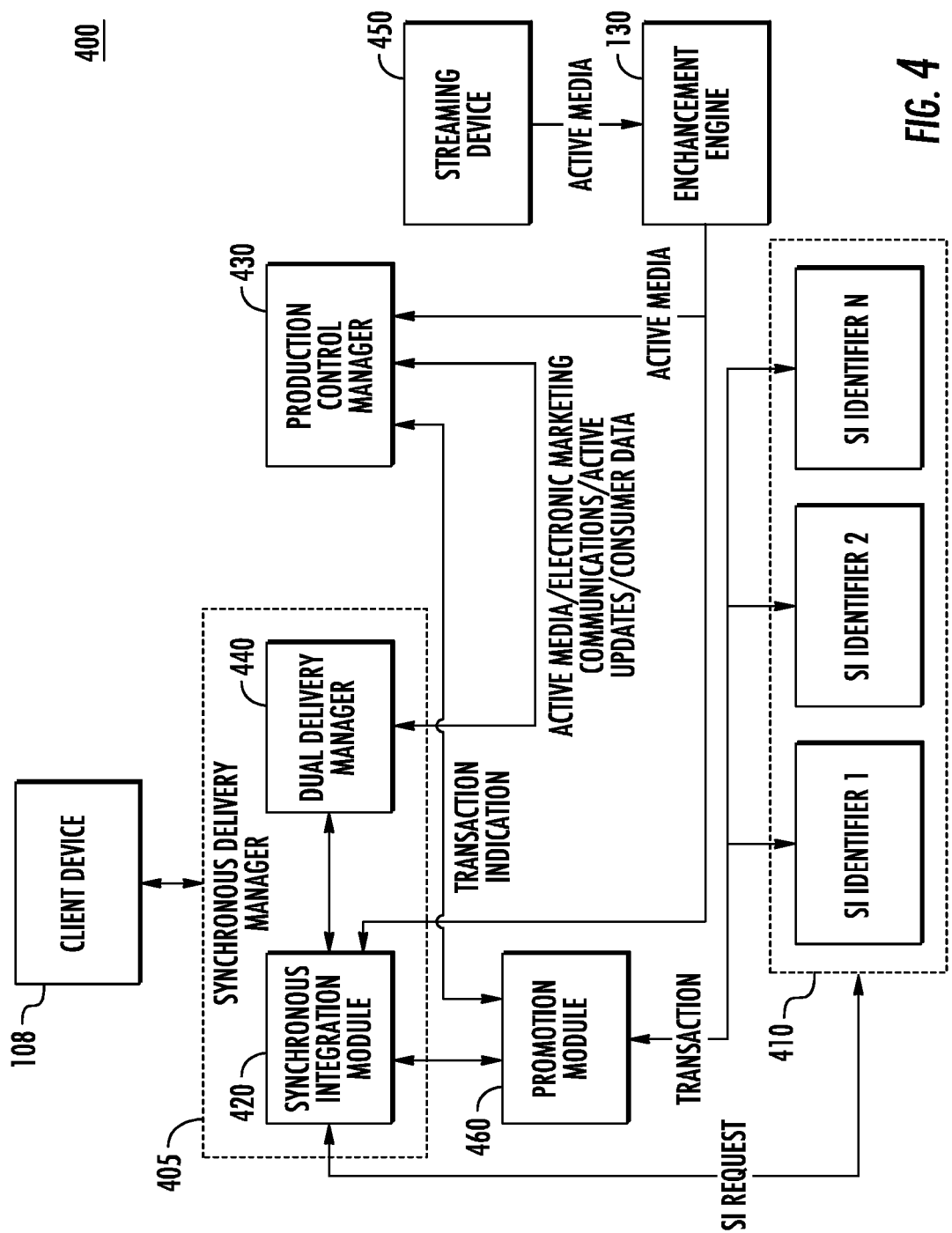
FIG. 4 illustrates an example data flow interaction between elements of an example device for implementing synchronous delivery of active media and electronic marketing communications in accordance with some example embodiments of the present invention.

In other embodiments, to synchronize the active updates and the active media, the active updates may be de-queued (e.g., removed or provided to one or more components described herein) from the memory 204 (e.g., one or more internal buffers) when the buffer identifier associated with the active media (e.g., encoded in the file stream of the active media) corresponds to the buffer identifier associated with the active updates in a similar manner as provided herein with respect to electronic marketing communications as referenced in FIG. 4.

In some embodiments, one or more consumers associated with one or more SI identifiers may request, via a client device 108 (e.g., a tablet or laptop), to associate with the synchronous integration interface. The request to associate with a synchronous integration interface may be received via the dual delivery circuitry 212. For example, the dual delivery circuitry 212 may respond to a get request (e.g., a request to "get create subscription") to associate with the synchronous integration interface. Alternatively, or additionally, the dual delivery circuitry 212 may provide the request to associate with the synchronous integration interface to the production control circuitry 214. The production control circuitry 214 may generate business analytic data based on the requests to subscribe. In some embodiments, the quantity of SI identifiers may be displayed via a user interface as described herein with reference to FIGS. 8 and 11.

Alternatively, or additionally, the requests to subscribe may inform the provision of one or more relevant promotions. The promotion relevance circuitry 216 includes hardware configured to identify relevant promotions and/or SI identifiers associated with the synchronous integration interface. In some embodiments, the promotion relevance circuitry 216 may leverage information provided by one or more client devices 108 to improve the relevancy of promotions provided to individual consumers or groups of consumers. In this manner, the promotion relevance circuitry 216 may determine electronic marketing communications of interest to individual consumers or groups of consumers. In other embodiments, the promotion relevance circuitry 216 may determine consumers, consumer accounts, and individuals that are more likely to associate with the synchronous integration interface. The determination may be based on clickstream data, location data, consumer data, and other information provided by and/or relating to particular consumers.

The promotion relevance circuitry 216 may be configured to determine electronic marketing communications to associate with one or more client devices 108 associated with the synchronous integration interface. The promotion relevance circuitry 216 may leverage information provided by the client device 108 to improve the relevancy of marketing communications to individual consumers or consumer groups. In this manner, the promotion relevance circuitry 216 may determine promotions, goods, and services that are more likely to be of interest to a particular consumer or group of consumers. The determination may be based on clickstream data, location data, consumer data, and other information provided by and/or relating to particular consumers.

In further embodiments, thee promotion relevance circuitry 216 may leverage information provided by the client device 108 to provide a dynamic interaction screen (e.g., a green screen including one or more relevant promotions) based on a SI identifier associated with the synchronous integration interface. In this manner, the promotion relevance circuitry 216 may determine promotions, goods, and services that are more likely to be of interest to a particular consumer or group of consumers. The determination may be based on location data, communication channel data, consumer data, and other information provided by and/or relating to particular consumers.

The promotion relevance circuitry 216 may receive the consumer data via a network interface provided by the communications circuitry 208. The promotion relevance circuitry 216 may utilize processing circuitry, such as the processor 202, to perform the actions described herein. However, it should also be appreciated that, in some embodiments, the promotion relevance circuitry 216 may include a separate processor, specially configured field programmable gate array (FPGA), or application specific interface circuit (ASIC). The promotion relevance circuitry 216 is therefore implemented using hardware components of the apparatus configured by either hardware or software for implementing these planned functions.

In some embodiments, the dual delivery circuitry 212 may be configured to respond to a request to receive SI identifier data. For example, the dual delivery circuitry 212 may push a request to "receive SI identifier data." The SI identifier data may be associated with one or more consumers, via one or more client devices 108, and may include communication channel data (e.g., the IP address of the client device 108).

In turn, the dual delivery circuitry 212 may be configured to provide the active media and/or the electronic marketing communications to the synchronous integration circuitry 210. For example, the dual delivery circuitry 212 may push the electronic marketing communications, promotion data, and/or active media to an API configured to receive the electronic marketing communications and active media. As will be appreciated, each request sent and received (e.g., incoming and outgoing data) may be performed simultaneously via the dual delivery circuitry 212.

The synchronous integration circuitry 210 may be configured to provide the synced active media and the electronic marketing communications to the client device 108 associated with the SI identifier. For example, the synchronous integration circuitry 210 may output the active media and electronic marketing communications, via communications circuitry 208 and input/output circuitry 206, on a tablet associated with the synchronous integration interface. The synchronous integration circuitry 210 may utilize processing circuitry, such as the processor 202, to perform the actions described herein. However, it should also be appreciated that, in some embodiments, the synchronous integration circuitry 210 may include a separate processor, specially configured field programmable gate array (FPGA), or application specific interface circuit (ASIC). The synchronous integration circuitry 210 is therefore implemented using hardware components of the apparatus configured by either hardware or software for implementing these planned functions.

The progression circuitry 218 includes hardware configured to determine, a SI identifier count based on one or more SI identifiers. For example, the SI identifier count may refer to the number of the client devices subscribed to the synchronous integration interface. In some embodiments, the SI identifier count may represent a status of the SI identifiers in relation to exceeding a SI progress threshold.

The progression circuitry 218 may be configured to monitor the SI identifier count. In some exemplary embodiments, the progression circuitry 218 may update the SI identifier count as a client device is associated with a synchronous integration interface as described herein with referenced to FIG. 6.

In further embodiments, the progression circuitry 218 may be configured to determine whether the SI identifier count exceeds a SI progress threshold. The progression circuitry 218 may compare the SI identifier count to the SI progress threshold. As the progression circuitry 218 monitors the SI identifier count, the progression circuitry 218 may determine the SI identifier count exceeds the SI progress threshold.

Upon determining a SI identifier count exceeds a SI progress threshold, the progression circuitry 218 may be configured to decrease an active sync component. In alternate or additional embodiments, upon determining a SI identifier count exceeds a SI progress threshold, the progression circuitry 218 may be configured to increase a promotion component (e.g., a discount value) in response to the SI identifier count exceeding the SI progress threshold. The progression circuitry 218 may utilize processing circuitry, such as the processor 202, to perform the actions described herein. However, it should also be appreciated that, in some embodiments, the progression circuitry 218 may include a separate processor, specially configured field programmable gate array (FPGA), or application specific interface circuit (ASIC). The progression circuitry 218 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200A. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 2B:
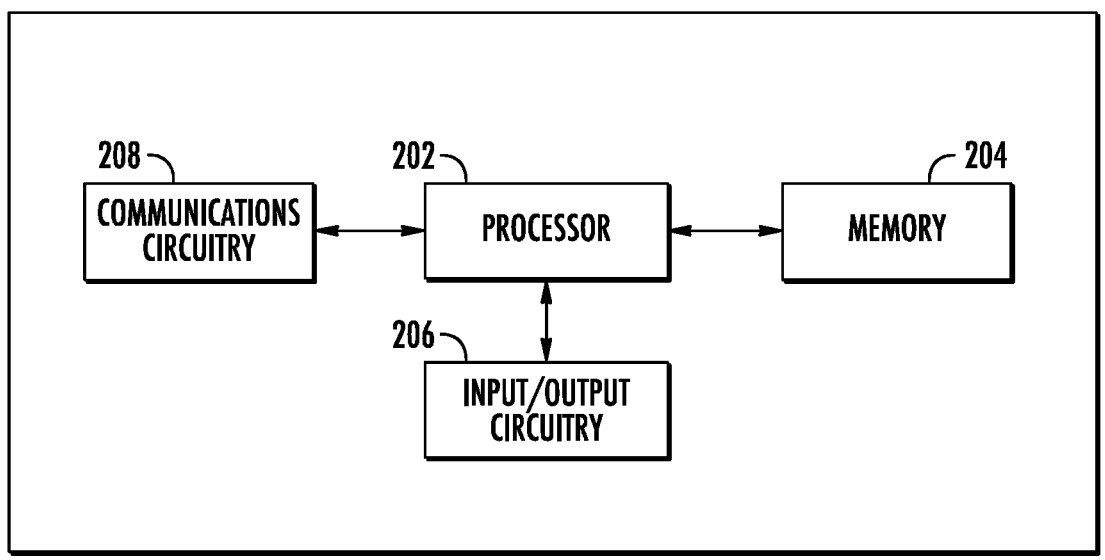
FIG. 2b illustrates a block diagram showing an example client device for implementing synchronous delivery of active media and electronic marketing communications using special-purpose circuitry in accordance with some example embodiments of the present invention.

The client device(s) 108 may be embodied by one or more computing systems, such as apparatus 200B shown in FIG. 2b. As illustrated in FIG. 2b, the apparatus 200B may include a processor 218, a memory 220, an input/output circuitry 222, and communications circuitry 224. The apparatus 200B may be configured to execute the operations described below with respect to FIGS. 1 and 3-11. The functioning of the processor 218, the memory 220, the input/output circuitry 222, and the communication circuitry 224 may be similar to the similarly named components described above with respect to FIG. 2a. For the sake of brevity, additional description of these components is omitted.

Example Electronic Marketing Information Service Data Flow

Figure 3:
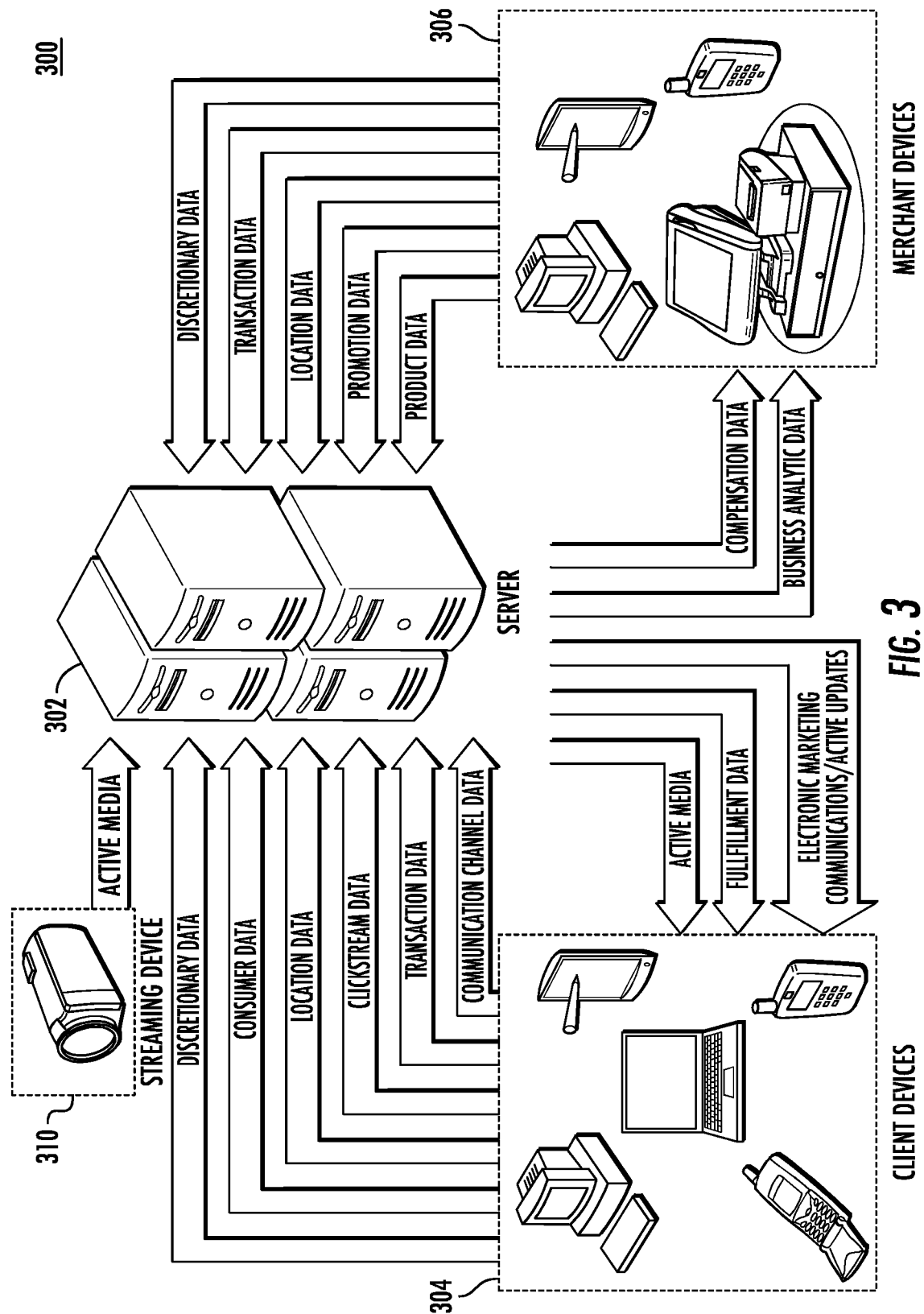
FIG. 3 illustrates an example data flow among a client device, a server, and a merchant device in accordance with some example embodiments of the present invention.

FIG. 3 depicts an example data flow 300 illustrating interactions between a server 302, one or more client devices 304, and one or more merchant devices 306. The server 302 may be implemented in the same or a similar fashion as the server 104 as described above with respect to FIG. 1, the one or more client devices 304 may be implemented in the same or a similar fashion as the client devices 108A-N as described above with respect to FIG. 1, the one or more streaming devices 310 may be implemented in the same or a similar fashion as the streaming devices 120 as described above with respect to FIG. 1, and the one or more merchant devices 306 may be implemented in the same or a similar fashion as the merchant devices 110A-N as described above with respect to FIG. 1.

The data flow 300 illustrates how electronic information may be passed among various systems when employing a server 302 in accordance with embodiments of the present invention. The one or more streaming devices 310, one or more client devices 304, and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

The data flow 300 illustrates how electronic information may be passed among various systems when employing a server 302 in accordance with embodiments of the present invention. The one or more client devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, consumer group data, group reward data, and/or discretionary data.

As a result of transactions performed between the one or more client devices 304 and the server 302, the server 302 may provide fulfillment data to the client devices. The fulfillment data may include information indicating whether the transaction was successful, the location and time the product will be provided to the consumer, instruments for redeeming promotions purchased by the consumer, or the like.

In addition to the e-commerce interactions with the one or more client devices 304 offered by the server 302, the server 302 may leverage information provided by the client devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the client device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various client devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 104 by providing synchronous delivery of active media and electronic marketing communications to the client device 108. Such synchronous delivery provides improved techniques for associating active media with electronic marketing communications as described herein. In particular, embodiments provide improved techniques for receiving active media and promotion data and providing such active media and promotion data to a client device in response to receiving a request to associate with a synchronous integration interface.

Further embodiments advantageously provide for improvements to the server 104 by improving the promotions provided by the server 104 to the client device 108 by providing for improved promotion relevance for inclusion in the synchronous integration interface. Such embodiments improve the operations and method for syncing active media and electronic marketing communications. In particular, embodiments provide improved techniques for evaluating clickstream data, location data, consumer data and other information provided by and/or relating to particular SI identifiers. Additionally, various aggregation, filtering, and sorting techniques are used to determine the most relevant promotions.

Furthermore, improvements to the server 104 include providing the ability to deliver active updates (e.g., updates to one or more promotion components performed in real-time, or near real-time) to active media and/or promotions included in the synchronous integration interface. Such embodiments improve the operations and methods for simultaneously receiving and/or providing the active updates to one or more promotion components. In particular, embodiments again provide improved techniques for evaluating clickstream data, location data, consumer data and other information provided by and/or relating to particular promotions and/or consumers.

As such, improvements described herein serve to provide a synchronous integration interface as provided by the server 104 by providing a platform to actively engage consumers, identifying promotions likely of interest to consumers, and providing active updates to cultivate a sense of urgency while a client device 108 is associated with the synchronous integration interface. Moreover, such improvements to server 104 serve to enhance sales and the ability of the promotion and marketing service to customize individual synchronous integration interfaces as provided by the server 104.

Example Synchronous Delivery of Active Media and One or More Promotions Via Promotion and Marketing Service FIG. 4 illustrates an example data flow interaction between a synchronous delivery manager 405 which may include synchronous integration module 420 and dual delivery manager 440. The synchronous delivery manager 405 may be associated with synchronous integration circuitry 212, dual delivery circuitry 212, and components of a promotion and marketing service 102 in accordance with some example embodiments of the present invention. The synchronous delivery manager 405 may communicate with other components of a promotion and marketing service 102 to provide synchronous delivery of active media and electronic marketing communications to a client device 108 associated with a promotion and marketing service. In the present example, the synchronous delivery manager 405 may manage the synchronous delivery of active media and electronic marketing communications by receiving, via production control manager 430, the electronic marketing communications.

The production control manager 430 may be associated with the production control circuitry 214 as referenced herein with respect to FIG. 2a. The production control manager 430 may associate with other components of the promotion and marketing service 102 such as the synchronous delivery manager 405 via the dual delivery manager 440. The production control manager 430 may query, via processing circuitry 202, database 106 to determine at least one promotion to include in the electronic marketing communication included in the synchronous integration interface. For example, the production control manager 430 may receive promotion content provided, via input/output circuitry 206, by a producer (e.g., a producer enters the promotion name or selects a promotion using a production dashboard) and, in turn, the production control manager 430 may query database 106 to receive the promotion to include in the electronic marketing communication. Alternatively or additionally, the production control manager 430 may provide the electronic marketing communications to the dual delivery manager 440. One or more receipt identifiers (e.g., one or more timestamps) may be encoded in the electronic marketing communications. The respective timing mechanisms (e.g., the one or more clocks associated the server 104) associated with the one or more receipt identifiers may begin at a base identifier (e.g., a base time of zero). However, in alternative or additional embodiments, the respective timing mechanisms may begin at a base identifier other than zero. The one or more receipt identifiers are then encoded in the metadata of the electronic marketing communications relative to the base identifier. In turn, the electronic marketing communications received by dual delivery manager 440, via the production control manager 430, may be stored in memory, such as the memory 204 (e.g., one or more internal buffers) as described with reference to FIG. 2a.

Further, the synchronous delivery manager 405 may receive, via the production control manager 430, active media (e.g., a live recording of a host featuring one or more promotions). The active media may correspond to the electronic marketing communications received by the dual delivery manager 440. When active media is captured by the streaming device 450 (e.g., a digital camcorder), the active media may be received by the enhancement engine 130. The enhancement engine 130 may communicate with other components of the promotion and marketing service to provide the active media to the production control manager 430 and/or the synchronous integration module 420. The enhancement engine 130 may be configured to encode the active media with one or more receipt identifiers (e.g., a timestamp included in the metadata of a file stream to achieve synchronization). The timing mechanism (e.g., the clock associated with the enhancement engine 130) associated with the one or more receipt identifiers may begin at a base identifier (e.g., a base time of zero). However, in alternative or additional embodiments, the timing mechanism may begin at a base identifier other than zero. The one or more receipt identifiers are then encoded in the metadata of the active media file stream relative to the base identifier. When the active media is received by the production control manager 430, the production control manager 430 may be configured to display, via communication circuitry 208, the active media for viewing by the producer monitoring a user interface (e.g., a production dashboard). To that end, the production control manager 430 may provide the active media to dual delivery manager 440 for synchronizing of the active media and electronic marketing communications. The active media received by the dual delivery manager 440, via the production control manager 430, may be stored in memory, such as the memory 204 (e.g., one or more buffers) as described with reference to FIG. 2a.

In some embodiments, the synchronous delivery manager 405 may be operable to synchronize the active media and the electronic marketing communications based at least in part on one or more receipt identifiers. The receipt identifiers associated with the active media may be encoded in the metadata of the active media by the enhancement engine 130 as described above. Such receipt identifiers allow the active media to become synced, via the synchronous delivery manager 405 (e.g., via the synchronous integration module 420), with the electronic marketing communications which may also be associated with one or more receipt identifiers as described above.

One or more buffer identifiers may be calculated and/or assigned according to the respective one or more receipt identifiers to normalize the time as between the receipt identifiers associated with the active media and the electronic marketing communications. To synchronize the electronic marketing communications and the active media, the electronic marketing communications may be de-queued (e.g., removed) from the memory 204 (e.g., one or more internal buffers) when the buffer identifier associated with the active media (e.g., encoded in the file stream of the active media) corresponds to (e.g., matches, aligns, etc.) the buffer identifier associated with the electronic marketing communications. The electronic marketing communications may be de-queued by, for example, the first-in-first-out (FIFO), last-in-first-out (LIFO), priority, or other methods for removing data from a buffer based on the respective buffer identifiers. To that end, the synchronous integration module 420 may be configured to fetch the electronic marketing communications and the active media from the memory 204 according to the order of the one or more buffer identifiers. In turn, the synchronous integration module 420 may provide a synced feed (e.g., a synced feed comprising active media and electronic marketing communications) to the client device 108. The client device 108 may then presents (e.g., renders) the synced feed. Thereby, presenting the synced feed for viewing by one or more consumers via the client device 108 as described herein below.

Figure 5:
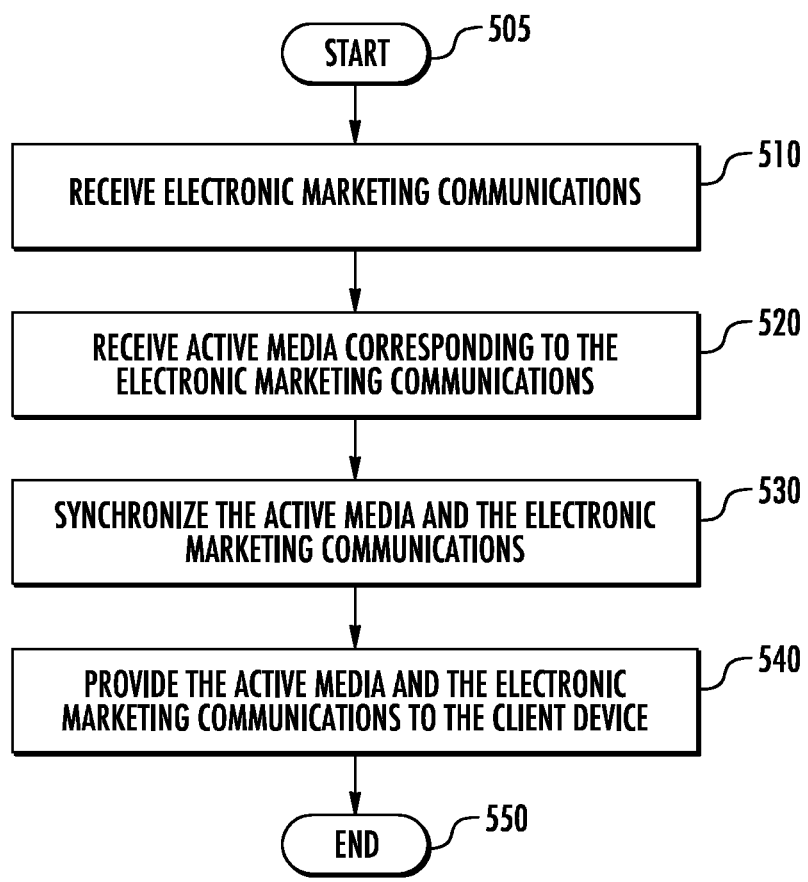
FIG. 5 illustrates a flowchart describing an exemplary process for providing synchronous delivery of active media and electronic marketing communications in accordance with some example embodiments discussed herein.

In some embodiments, one or more consumers associated with one or more SI identifiers 410 may request, via a client device 108 (e.g., a tablet or laptop), to associate with the synchronous integration interface. The request to associate with a synchronous integration interface may be received by the synchronous delivery manager 405, via the client device 108 and the synchronous integration module 420. In turn, the synchronous integration module 420 may provide the synced active media and the electronic marketing communications to the client device 108 associated with the SI identifier 410 that requested to associate with the synchronous integration interface. For example, the synchronous integration module 420 may output a synced feed comprising the active media and electronic marketing communications, via communications circuitry 208 and input/output circuitry 206, on a tablet associated with the synchronous integration interface. FIGS. 5-6 further describe example embodiments of operations and processes for providing synchronous delivery of active media and electronic marketing communications.

Example Process for Providing Synchronous Delivery of Active Media and Promotions Turning now to FIG. 5, example operations for providing synchronous delivery of active media and electronic marketing communications are illustrated from the perspective of a promotion and marketing service that incorporates a synchronous delivery manager. Providing a platform to associate with a synchronous integration interface engages consumers and incentivizes such consumers to purchase promotions which positively impacts the volume of promotions purchased. The operations illustrated in FIG. 5 may, for example, be performed by elements of the promotion and marketing service 102 (e.g., the server 104) described with respect to FIG. 1, with the assistance of, and/or under the control of one or more devices, such as apparatus 200A and/or 200B. In particular, embodiments of a process 500 may be performed by synchronous integration circuitry 210, dual delivery circuitry 212, production control circuitry 214, and promotion relevance circuitry 216 as described above with respect to FIGS. 2a and 2b. Such circuitry may provide means for performing the various actions described with respect to the process 500.

Flow diagram 500 may begin at action 505 and proceed to action 510, where the server 104 may be configured to receive electronic marketing communications. For example, server 104 may receive electronic marketing communications provided, via input/output circuitry 206, in response to a query of the database 106.

As shown in block 520 of FIG. 5, the system 102, may include means, such as the server 104 for receiving active media. The active media may correspond to the electronic marketing communications received by server 104. For example, a live recording including a host and electronic marketing communications may be received by server 104, via an enhancement engine 130. The enhancement engine 130 may be configured to encode the active media with one or more receipt identifiers. For example, enhancement engine 130 may encode one or more timestamps in the data stream associated with the live recording featuring the host and the electronic marketing communications. The timestamps will allow for synchronization of the active media and the electronic marketing communications.

As shown in block 530 of FIG. 5, the promotional system 102, may include means, such as the server 104 for synchronizing the active media and the electronic marketing communications based at least in part on one or more receipt identifiers as described above with reference to FIG. 4.

Figure 7:
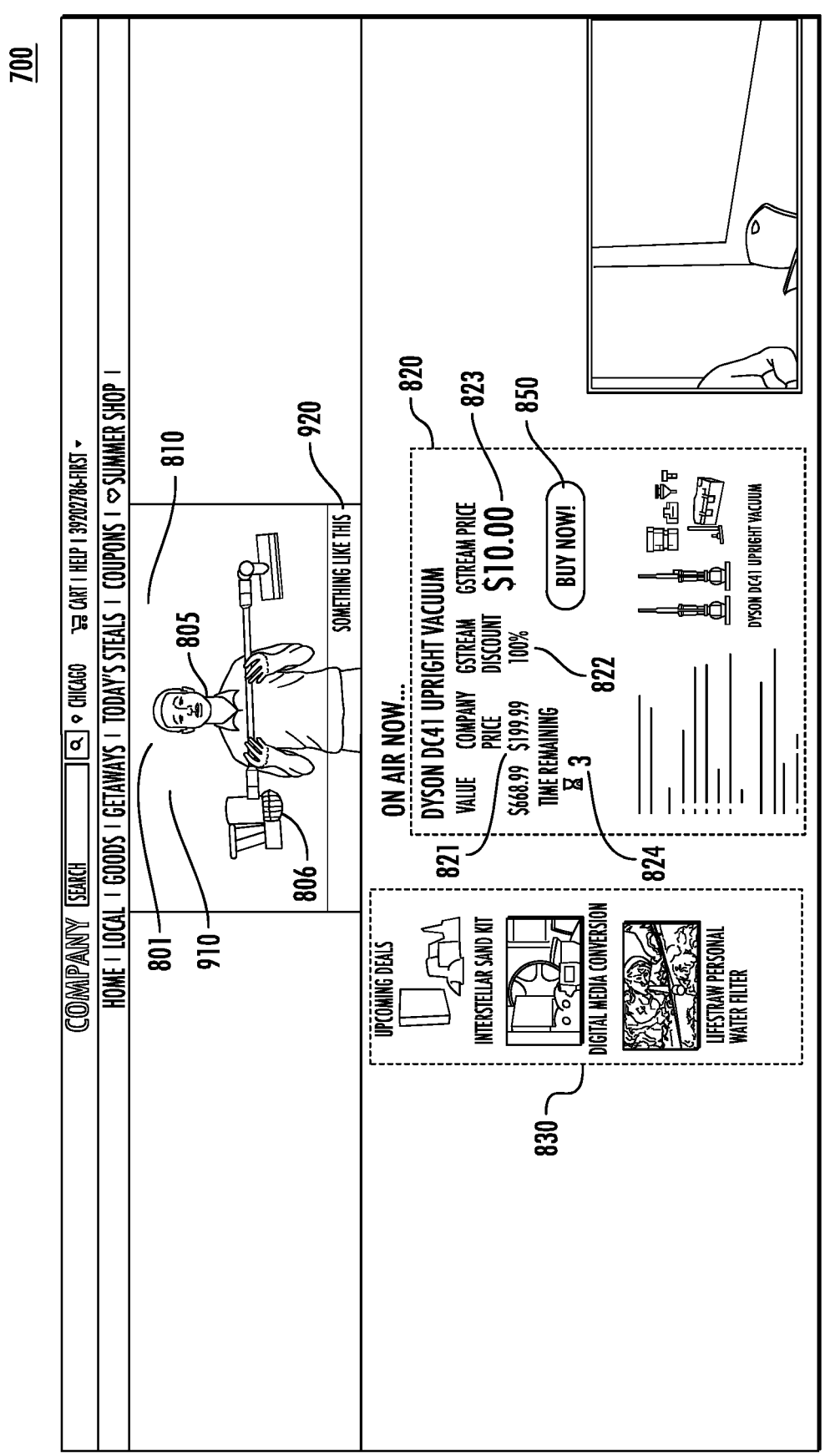
FIG. 7 illustrates an example graphical user interface for providing synchronous delivery of active media and electronic marketing communications that may be presented by various components of systems in accordance with some example embodiments discussed herein.

Flow diagram 500 may proceed to action 540, where the server 104 may be configured to provide the synced active media and the electronic marketing communications to a client device. Upon accessing a user interface (e.g., the synchronous integration interface as described herein with reference to FIGS. 2A and 7) associated with promotion and marketing service 102, or receiving an electronic marking communication (e.g., an email including an invitation to associate with a synchronous integration interface), a consumer may request to associate with a synchronous integration interface via a client device 108 (e.g., the consumer's mobile device). The request to associate with a synchronous integration interface may be received by server 104. In turn, the server 104 may generate a synchronous integration interface (e.g., the interface as illustrated in FIG. 7) which may include a web user interface, a mobile application, and/or the like of the synced feed comprising active media and electronic marketing communications in response to the client device 108 associating with the synchronous integration interface.

Example Process for Providing Synchronous Delivery of Active Updates

FIG. 6 illustrates example operations for providing synchronous delivery of active updates from the perspective of a promotion and marketing service that incorporates a synchronous delivery manager. Providing a platform to deliver active updates incentivizes consumers to take advantage of the promotion while associated with a synchronous integration interface which positively impacts the volume of promotions purchased. The operations illustrated in FIG. 6 may, for example, be performed by elements of the promotion and marketing service 102 (e.g., the server 104)

described with respect to FIG. 1, with the assistance of, and/or under the control of one or more devices, such as apparatus 200A and/or 200B. In particular, embodiments of a process 600 may be performed by synchronous integration circuitry 210, dual delivery circuitry 212, production control circuitry 214, promotion relevance circuitry 216, and progression circuitry 218 as described above with respect to FIGS. 2a and 2b. Such circuitry may provide means for performing the various actions described with respect to the process 600.

The system 102 may be configured to receive active updates (e.g., updates to corresponding data in real-time or near real-time that may occur within the range of 25 milliseconds to 50 milliseconds) to one or more promotion components (e.g., a promotional value, discount value, active sync component, etc.) associated with the synchronous integration interface. In order to synchronize the active media and the electronic marketing communications, in some embodiments, the updates to the synchronous integration interface may be queued, or delayed, until one or more receipt identifiers associated with the active media corresponds to the one or more receipt identifiers associated with the electronic marketing communication. Flow diagram 600 may begin at action 605 and proceed to action 610, where the server 104 may be configured to determine, via the processing circuitry 202, a SI identifier count based on one or more SI identifiers. The SI identifier count may refer to an accumulation of accounts subscribed (e.g., the number of the client devices accessing a synchronous integration interface associated with the synchronous integration interface). The SI identifier count may represent a status of the SI identifiers in relation to exceeding a SI progress threshold. The server 104 may monitor the SI identifier count. In some exemplary embodiments, the server 104 may update the SI identifier count as a client device is associated with a synchronous integration interface. For example, the server 104 may increase the SI identifier count from 109 to 110 when the 110$^{th}$ client device 108 is associated with the synchronous integration interface.

Flow diagram 600 may proceed to action 620, where the server 104 may be configured to determine, via the processing circuitry 102, whether the SI identifier count exceeds a SI progress threshold. A pre-determined, or dynamically generated, SI progress threshold may be stored in database 106. The server 104 may compare the SI identifier count to the SI progress threshold. As the server 104 monitors the SI identifier count, the server 104 may determine the SI identifier count exceeds the SI progress threshold. For example, the server 104 may determine the SI identifier count is "501." The server 104 may compare the SI identifier count "501" to the SI progress threshold "500" and determine that the subscription progress exceeds the SI progress threshold.

Upon determining a SI identifier count exceeds a SI progress threshold, flow diagram 600 may proceed to block 630. As shown in block 630, system 102 may include means, such as the server 104 which may be configured to decrease an active sync component. For example, the active sync component (e.g., the GStream price) may be decreased from $20 to $10. Alternatively, or additionally, upon determining a SI identifier count exceeds a SI progress threshold, the server 104 which may be configured to increase a discount value in response to the SI identifier count exceeding the SI progress threshold. For example, the discount value (e.g., the GStream Discount) may be increased from 20% to 50%. It should be appreciated that discount value may be configured to decrease or increase. The active sync component may be configured to increase or decrease based on the discount value. Such increasing of the discount value and/or decreasing of the active sync component may incentivize consumers to purchase promotions while the promotions may be obtained at the discounted value. In some embodiments, the SI identifier count may also be used to alter the synchronization of active media and electronic marketing communications. For example, different queues of messages may be associated with vary SI identifier counts, with messages associated with the receipt identifiers of the active media as described above. Different electronic marketing communications may correspond with a receipt identifier of the active media based on changes in tracking SI identifier count, and may be provided from the suitable queue during synchronization as describe above.

In an alternate or additional example embodiment, the SI progress threshold may be "500." The server 104 may compare the SI identifier count "499" to the SI progress threshold "500" and determine that the SI identifier count does not exceed the SI progress threshold. At which point the SI identifier count does not exceed the SI progress threshold, the server 104 may return to action 610 to continue monitoring the SI identifier count.

In further embodiments, server 104 may be configured to receive active updates to one or more promotion components (e.g., decreasing the active sync component) in response to the server 104 receiving an audio trigger (e.g., a voice command). The audio trigger may be activated by commands received from a human voice, digital voice, or other source of audible speech. The source of audible speech may provide an audio trigger to server 104 that provides an active update to one or more promotion components (e.g., the discount value). For example, the host may state "I am increasing the GStream Discount to 50%." The server 104 may receive the audio trigger (e.g., "increasing the GStream Discount to 50%). In turn, the server 104 may be configured to increase a discount value from 10% to 50%.

Example Interface for Providing Synchronous Delivery of Active Media and Promotions FIG. 7 illustrates an interface for providing synchronous delivery of active media and electronic marketing communications to a client device via a system 102. After requesting to associate with a synchronous integration interface, a consumer may be presented with an interface allowing the consumer to interact with the synchronous integration interface. These interfaces may provide the consumer with the ability to view and/or hear the active media 801 and the electronic marketing communications 820 as illustrated in FIG. 7. Such graphical user interface display (e.g., synchronous integration interface 700) may be displayed via a client device 108 (e.g., a tablet, notebook, laptop, etc.) as a web page. In other embodiments, graphical user interface display 700 may be displayed via a client device 108 (e.g., a mobile device, wearable, etc.) in the form of an application interface (not shown).

As can be seen in FIG. 7, the system 102, may provide, via input/output circuitry 206, synchronous integration interface 700. Synchronous integration interface 700 may provide the synced feed (e.g., the synced active media 801 and electronic marketing communications 820) to the client device 801. Active media 801 may include a host 805, product 806 corresponding to promotion 820, and/or any other persons (e.g. guests, providers, etc.) or items associated with the active media. The synchronous integration interface 700 may also include electronic marketing communications (e.g., the "Dyson DC41 Upright Vacuum" electronic marketing communication). The electronic marketing communications 820 may include one or more promotion components (e.g., the promotion value 821 "$199.99," discount value 822 "100%," active sync component 823 "$10.00," and activity button 850 "BUY NOW!"). The system 102 may receive an indication of a transaction (e.g., the purchase of a promotion during an synchronous integration interface) in response to the selection of a link, an icon, or a button (e.g., when a consumer selects activity button 850). As described above with reference to FIG. 6, the promotion components (e.g., discount value 822 and the active sync component 823) may be configured to increase or decrease, or change as appropriate.

In some embodiments, the synchronous integration interface 700 may include a promotion expiration indicator 824 (e.g., a countdown timer). The promotion expiration indicator may be configured to indicate, via production control circuitry 214 and/or dual delivery circuitry 212, a promotion duration (e.g., the time remaining to purchase a promotion). For example, here the countdown timer indicates the time remaining to purchase the promotion at $10.00 is 3 seconds.

As the synchronous integration interface continues, the synchronous integration interface 700 may be configured to maintain the engagement of the one or more consumers by including a promotion queue 830. The promotion queue 830 may indicate one or more subsequent promotions which may be featured via active media 801.

In some embodiments, the synchronous integration interface 700 may include a dynamic interaction screen 810 (e.g., a green screen). The system 102 may be configured to generate a plurality of dynamic interaction screens 810. The dynamic interaction screen 810 may correspond to electronic marketing communications. In some embodiments, the dynamic interaction screen 810 may be configured to dynamically tailor the content of the dynamic interaction screen 810 based on the SI identifier and/or the client device associated with the synchronous integration interface. For example, a client device associated with a SI identifier and the location data (e.g., location data provided by locations services of a mobile device) indicating the client device location is "Charlotte, N.C." may view a dynamic interaction screen 810 which includes a promotion from a provider local to "Charlotte, N.C."

FIG. 7 may include active notification 920. The active notifications 920 may communicate the availability of electronic marketing communications to increase the urgency by which the consumer may purchase a promotion. For example, the notification may be a scrolling marquee located proximate to the active media 801.

FIGS. 8-11 illustrate interfaces for managing the provision of the synchronous delivery of active media and electronic marketing communications to a client device. A producer, or other like resource, may be presented with an interface allowing the producer to manage the content of the synchronous integration interface. These interfaces may provide the producer with the ability to control, via the production control circuitry 214, the promotions, notifications, promotion components, and other like content corresponding to the active media and/or the electronic marketing communications. Such interfaces may further provide the producer with the ability to hear and/or view the active media 801 and the electronic marketing communications 820 as illustrated in FIG. 7. Graphical user interface display 800 may be displayed via a client device 108 (e.g., a tablet, notebook, laptop, etc.) as a web page. In other embodiments, graphical user interface display 800 may be displayed via a client device 108 (e.g., a mobile device, wearable, etc.) in the form of an application interface (not shown).

Figure 8:
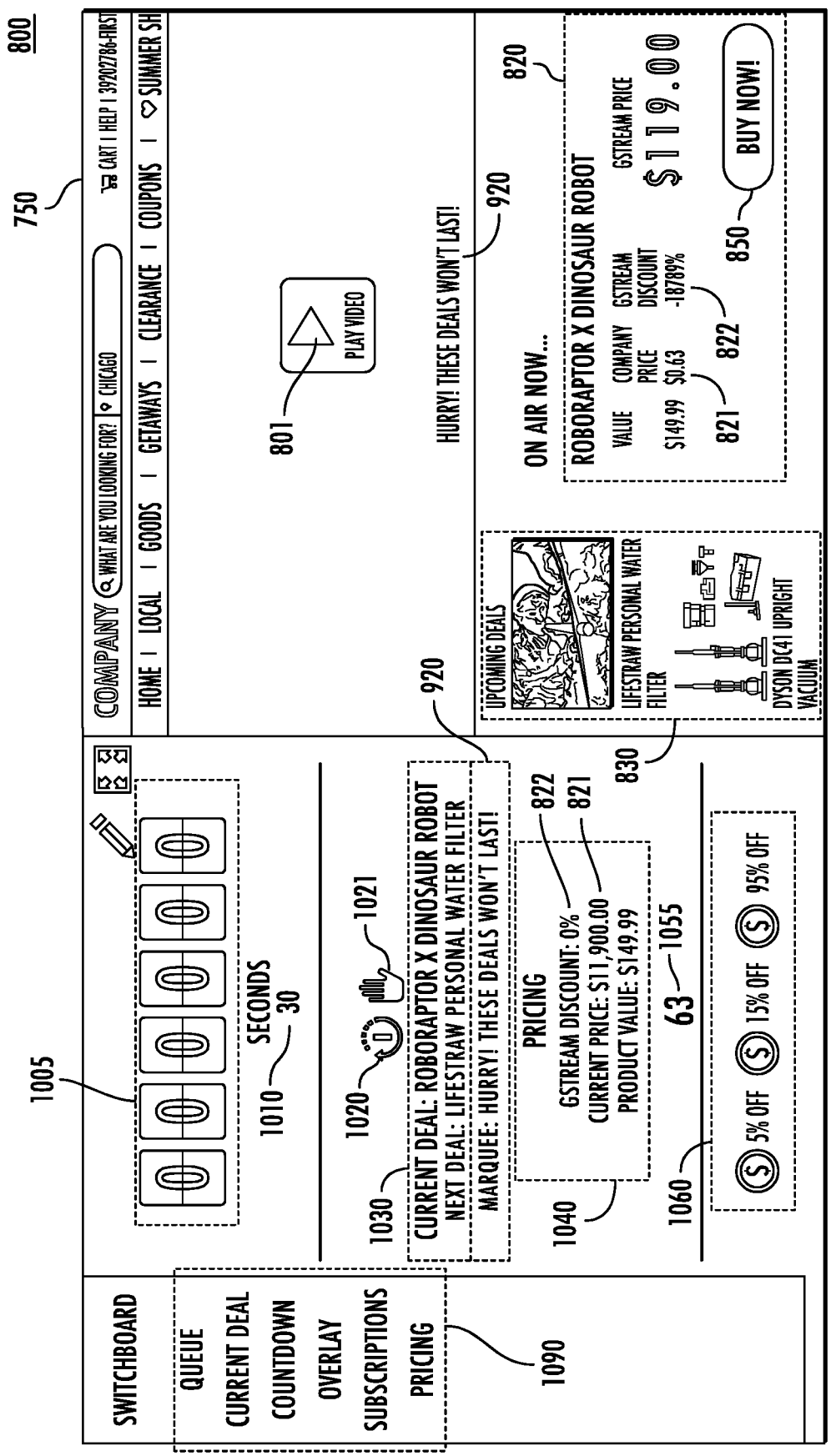
FIG. 8 illustrates an example graphical user interface for providing production control that may be presented by various components of systems in accordance with some example embodiments discussed herein.

As can be seen in FIG. 8, the system 102, may provide, via input/output circuitry 206, graphical user interface display 800 (e.g., a dashboard operable by a producer). The graphical user interface display 800 may include activity buttons 1090 (illustrated as "Queue," "Current Deal," "Countdown," "Overlay," "Subscriptions," and "Pricing"), timer 1005, promotion expiration value 1010 "30", activity button 1020 (e.g., a button that upon selection activates the promotion duration period, activity button 1021 (e.g., a button that upon selection terminates the promotion duration period), promotion queue 1030 "Current Deal: Roboraptor X Dinosaur Robot" and "Next Deal: Lifestraw Personal Water Filter," active notification 920 "Marquee: Hurry! These deals won't last! !," promotion components 1040, consumer rating indicator 1055 (e.g., a value that indicates the quantity of SI identifiers associated with the synchronous integration interface), and rapid value indicators 1060 (e.g., one or more buttons that upon selection provide active updates to one or more promotion components).

In further embodiments, the graphical user interface display 800 may provide active updates to a client device. The active updates may be configured to update one or more promotion components (e.g., a promotional value, discount value, and an active sync component). For example, the system 102 may be configured to decrease or increase the discount value 822.

Yet in further embodiments, the graphical user interface display 800 may include rapid indicator values 1060 which may be configured to decrease or increase the discount value. For example, when selected the discount value increases or decreases by 5%, 15%, or 95%.

Figure 9:
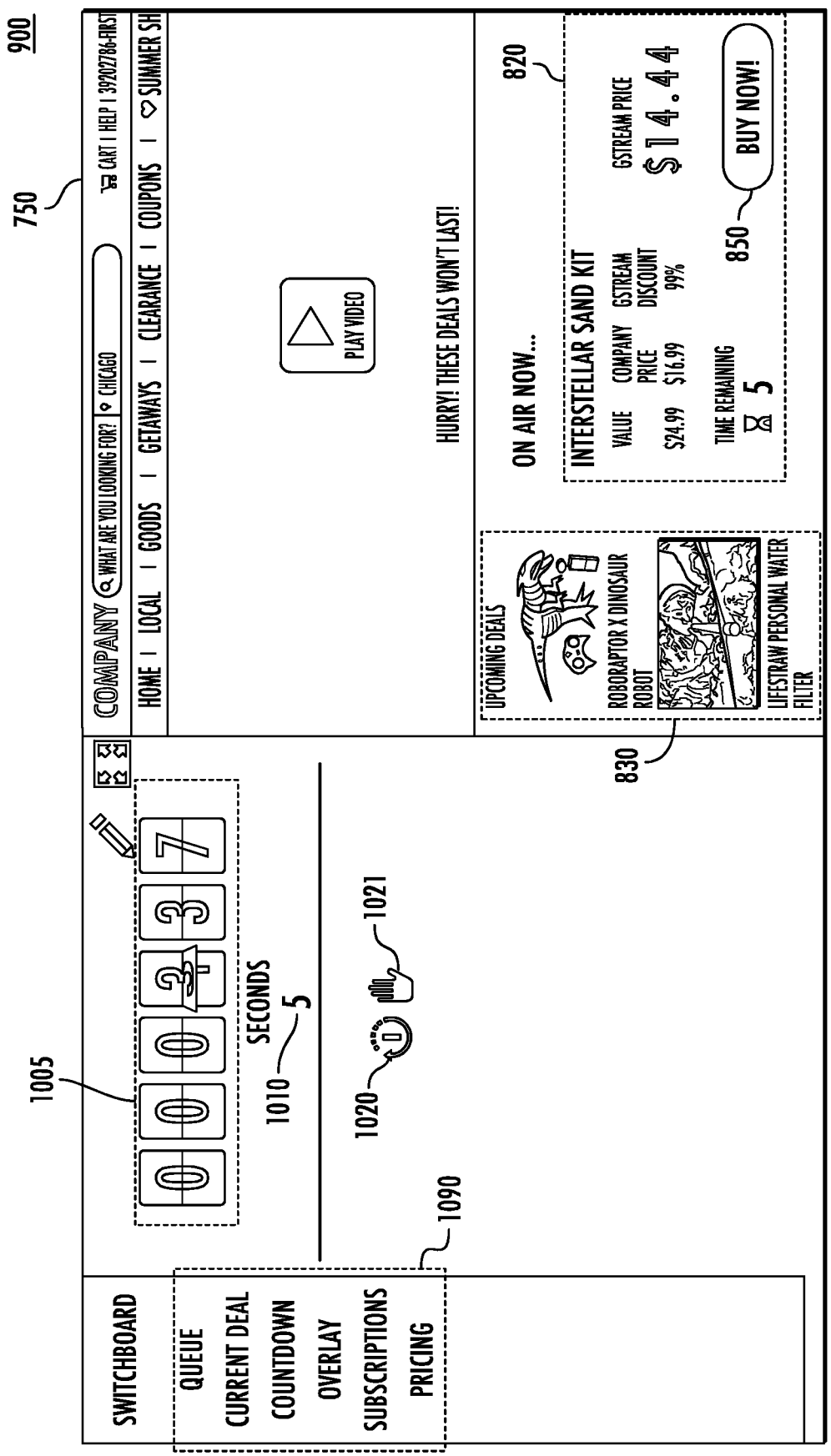
FIG. 9 illustrates an example graphical user interface for providing production control that may be presented by various components of systems in accordance with some example embodiments discussed herein.

As illustrated the graphical user interface display 800 includes a promotion expiration value 1010 which is configured to indicate the promotion duration period as described herein with reference to FIG. 9.

FIG. 9 is an example illustration of graphical user interface display 900. The system 102 may generate graphical user interface display 900 in response to a user (e.g., a producer) selecting activity button 1090 (e.g., "Countdown") to allow a user to modify the duration of a promotion (e.g., the promotion 820 "Interstellar Sand Kit"). The graphical user interface display 900 may be configured to receive the promotion expiration value 1010 "5" which may indicate a promotion duration period "5 seconds." The activity button 1020 may be configured to activate the 5 second promotion duration period. Upon activation of the promotion duration period, timer 1005 may be activated. In further embodiments, the activity button 1021 may be configured to terminate (e.g., stop the timer 1005 prior to expiration) the promotion duration period.

Returning to FIG. 8, in some embodiments, graphical user interface display 800 may include the active media 801 and electronic marketing communication 820. As described herein, one or more promotion components may be updated or modified via the graphical user interface display 800. Alternatively, or additionally, the modifications and/or updates may be reflected (e.g., illustrated) in interface 750 by the promotions 820, promotion queue 830, active media 801, and promotion components 821 and 822.

Figure 10:
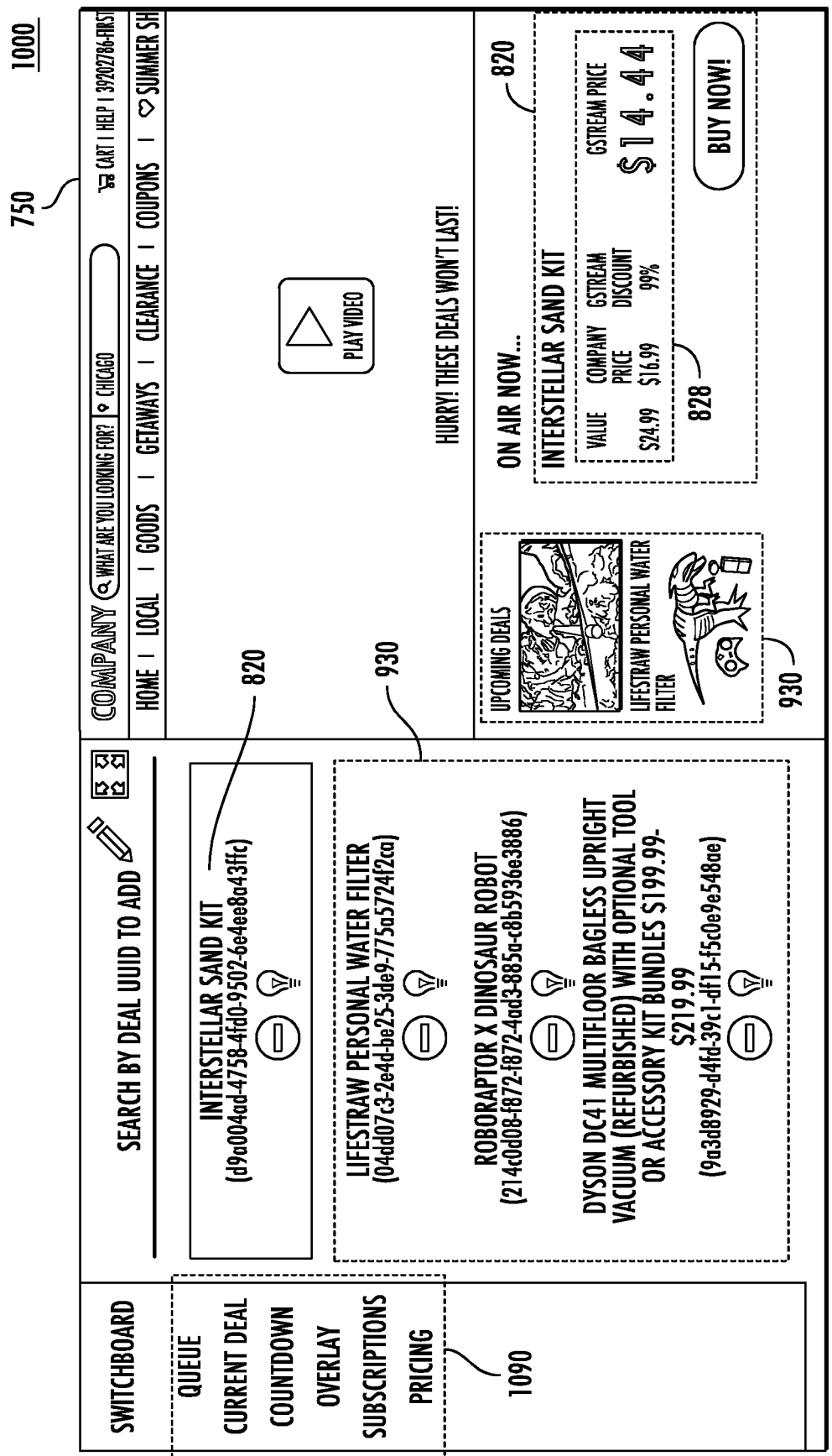
FIG. 10 illustrates an example graphical user interface for providing production control that may be presented by various components of systems in accordance with some example embodiments discussed herein.

FIG. 10 is an example illustration of graphical user interface display 1000. System 102 may generate graphical user interface display 1000 in response to a user (e.g., a producer) selecting the activity button 1090 (e.g., "Queue") to allow a user to modify electronic marketing communications (e.g., the promotion 820 "Interstellar Sand Kit" and promotions 930). The graphical user interface display 1000 may include a promotion queue 930 further comprising one or more promotions that may be included in upcoming electronic marketing communications 820 such as "Lifestraw Personal Water Filter," "Roboraptor X Dinosaur Robot," "Dyson DC41 Multifloor Bagless Upright Vacuum." As will be appreciated by one of ordinary skill in the art, the promotion queue 930 may be re-ordered and/or populated on-demand, via user input, or dynamically based on relevance data.

As graphical user interface display 1000 receives active updates to electronic marketing communications, the active updates may be reflected by interface 750 as illustrated by the active media 801 and the corresponding one or more promotions 930 and the one or more promotion components 828.

Figure 11:
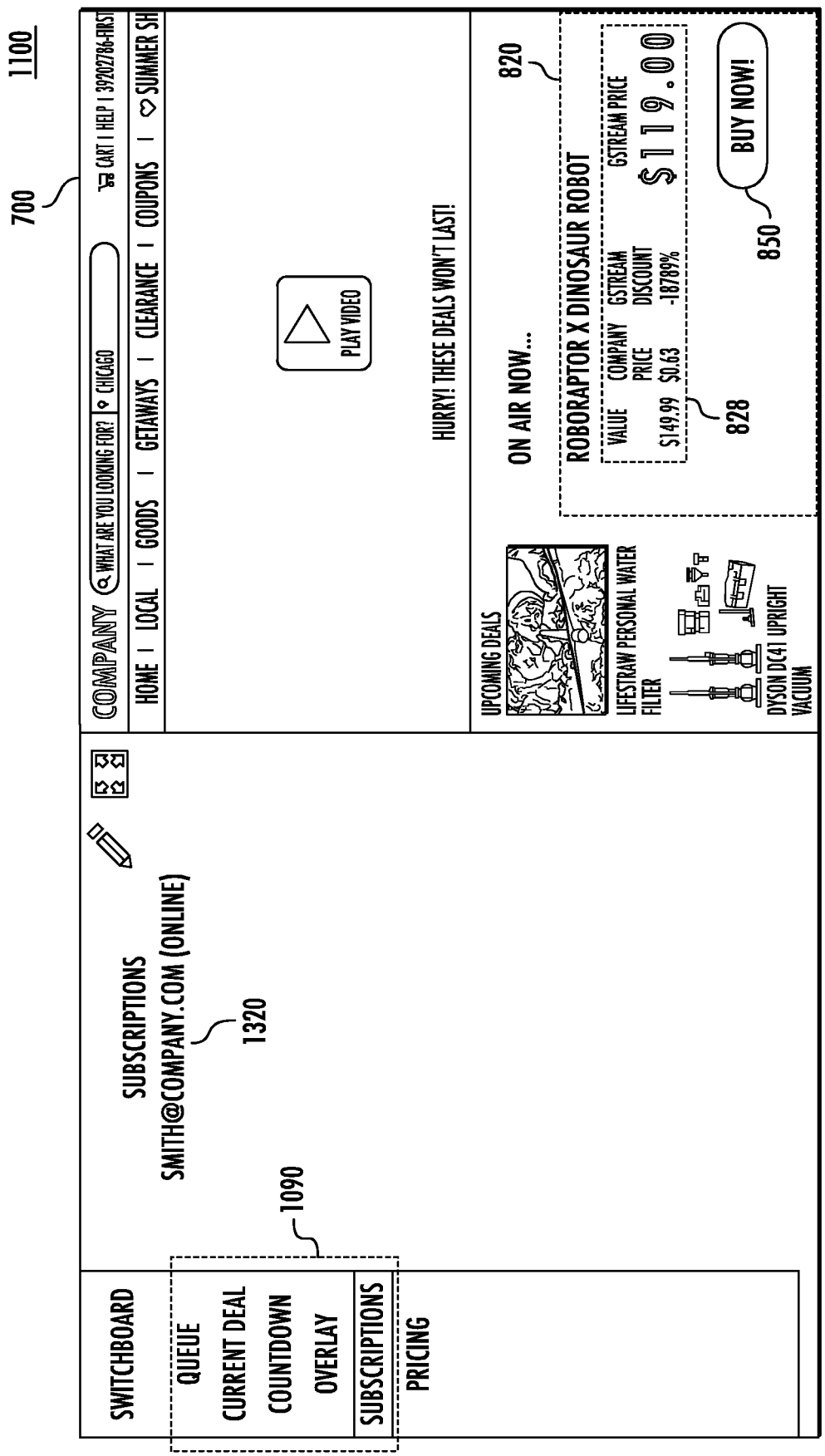
FIG. 11 illustrates an example graphical user interface for providing production control that may be presented by various components of systems in accordance with some example embodiments discussed herein.

FIG. 11 is an example illustration of graphical user interface display 1100. The system 102 may generate graphical user interface display 1100 in response to a user (e.g., a producer) selecting the activity button 1090 (e.g., "Subscriptions"). The graphical user interface display 1100 may be configured to indicate one or more SI identifiers 1320 (e.g., theron@groupon.com) and/or client devices associated with the synchronous integration interface to allow the user to simultaneously view the SI identifiers and/or client devices that are associated with the synchronous integration interface.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions, which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein. Accordingly, blocks of the block diagrams and flowchart illustrations support combinations of means for performing the specified functions, combinations of steps for performing the specified functions and program instruction means for performing the specified functions. With regard to such flowchart illustrations, while various embodiments are described as sequential steps for illustrative purposes, the inventive concepts described herein are not necessarily limited to the sequences illustrated. Indeed, various steps may be performed before or after the other as may be apparent to one of ordinary skill in the art in view of the disclosure. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus configured to provide synchronous delivery of active media and electronic communications to client devices, the apparatus comprising:
    a processor including one or more processing devices configured to perform independently or in tandem to execute hard-coded functions or execute software instructions; and
    a memory comprising one or more volatile or non-volatile electronic storage devices storing computer-readable instructions, the computer-readable instructions being configured, when executed, to cause the processor to:
    receive the electronic communications, wherein the electronic communications comprise one or more electronic communication timestamps encoded in electronic communication metadata of the electronic communications and relative to a first base identifier;
    receive the active media, wherein the active media corresponds to the electronic communications, wherein the active media comprises one or more active media timestamps encoded in active media metadata of the active media and relative to a second base identifier;
    synchronize the active media and the electronic communications based at least in part on the one or more active media timestamps and the one or more electronic communication timestamps, wherein the computer-readable instructions are configured to, when executed, cause the processor to:
  calculate one or more electronic communication buffer identifiers based at least in part on the one or more electronic communication timestamps and the first base identifier;
  calculate one or more active media buffer identifiers based at least in part on the one or more active media timestamps and the second base identifier; and
  synchronize the active media and the electronic communications based at least in part on the one or more active media buffer identifiers and the one or more electronic communication buffer identifiers; and
  provide the active media and the electronic communications to the client devices.

2. The apparatus of claim 1, wherein the memory stores the computer-readable instructions that, when executed, cause the processor to:
  receive, via synchronous integration circuitry, a synchronous integration request to associate with a synchronous integration interface; and
  provide, via synchronous integration circuitry, the synced active media and the electronic communications to the client devices.

3. The apparatus of claim 2, wherein the memory stores the computer-readable instructions that, when executed, cause the processor to:
  determine a synchronous integration identifier count based on one or more synchronous integration identifiers; and
  determine whether the synchronous integration identifier count exceeds a synchronous integration progress threshold.

4. The apparatus of claim 3, wherein the memory stores the computer-readable instructions that, when executed, cause the processor to:
  decrease an active sync component in response to the synchronous integration identifier count exceeding the synchronous integration progress threshold.

5. The apparatus of claim 3, wherein the memory stores the computer-readable instructions that, when executed, cause the processor to:
  increase a discount value in response to the synchronous integration identifier count exceeding the synchronous integration progress threshold.

6. The apparatus of claim 1, wherein the electronic communications are stored in one or more internal buffers of the memory, wherein the computer-readable instructions are configured, when executed, to cause the processor to:
  fetch the electronic communications from the one or more internal buffers in a first-in-first-out (FIFO) priority.

7. The apparatus of claim 1, wherein the electronic communications are stored in one or more internal buffers of the memory, wherein the computer-readable instructions are configured, when executed, to cause the processor to:
  fetch the electronic communications from the one or more internal buffers in a last-in-first-out (LIFO) priority.

8. A machine implemented method for providing synchronous delivery of active media and electronic communications to client devices, the machine implemented method comprising:
  receiving, via processing circuitry, the electronic communications, wherein the electronic communications comprise one or more electronic communication timestamps encoded in electronic communication metadata of the electronic communications and relative to a first base identifier;
  receiving, from a streaming device, the active media, wherein the active media corresponds to the electronic communications, wherein the active media comprises one or more active media timestamps encoded in active media metadata of the active media and relative to a second base identifier;
  synchronizing, via synchronous delivery management circuitry, the active media and the electronic communications based at least in part on the one or more active media timestamps and the one or more electronic communication timestamps, wherein the synchronizing the active media and the electronic communications further comprises:
    calculating one or more electronic communication buffer identifiers based at least in part on the one or more electronic communication timestamps and the first base identifier;
    calculating one or more active media buffer identifiers based at least in part on the one or more active media timestamps and the second base identifier; and
    synchronizing the active media and the electronic communications based at least in part on the one or more active media buffer identifiers and the one or more electronic communication buffer identifiers; and
  providing, via the processing circuitry, the active media and the electronic communications to the client devices.

9. The machine implemented method of claim 8, wherein synchronizing the active media and the electronic communications further comprises:
  receiving, via synchronous integration circuitry, a synchronous integration request to associate with a synchronous integration interface; and
  provide, via synchronous integration circuitry, the synced active media and the electronic communications to the client devices.

10. The machine implemented method of claim 9, further comprising:
  determining, via the processing circuitry, a synchronous integration identifier count based on one or more synchronous integration identifiers; and
  determining, via the processing circuitry, whether the synchronous integration identifier count exceeds a synchronous integration progress threshold.

11. The machine implemented method of claim 10, further comprising:
  decreasing, via the processing circuitry, an active sync component in response to the synchronous integration identifier count exceeding the synchronous integration progress threshold.

12. The machine implemented method of claim 10, further comprising:
  increasing, via the processing circuitry, a discount value in response to the synchronous integration identifier count exceeding the synchronous integration progress threshold.

13. A system configured to provide synchronous delivery of active media and electronic communications to client devices, the system comprising:
  processing circuitry configured to:
    determine the electronic communications, wherein the electronic communications comprise one or more electronic communication timestamps encoded in electronic communication metadata of the electronic communications and relative to a first base identifier;
a streaming device configured to:
  receive the active media, wherein the active media corresponds to the electronic communications, wherein the active media comprises one or more active media timestamps encoded in active media metadata of the active media and relative to a second base identifier;
synchronous delivery management circuitry configured to:
  synchronize the active media and the electronic communications based at least in part on the one or more active media timestamps and the one or more electronic communication timestamps, wherein the streaming device is configured to:
    calculate one or more electronic communication buffer identifiers based at least in part on the one or more electronic communication timestamps and the first base identifier;
    calculate one or more active media buffer identifiers based at least in part on the one or more active media timestamps and the second base identifier; and
    synchronize the active media and the electronic communications based at least in part on the one or more active media buffer identifiers and the one or more electronic communication buffer identifiers; and
wherein the processing circuitry is configured to further:
  provide the active media and the electronic communications to the client devices.

* * * * *